United States Patent [19]

Segal

[11] 4,319,927

[45] Mar. 16, 1982

[54] PORTLAND-TYPE CEMENTS

[75] Inventor: Robert M. Segal, Sparta, N.J.

[73] Assignee: The Flintkote Company, Rochelle Park, N.J.

[21] Appl. No.: 147,348

[22] Filed: May 7, 1980

[51] Int. Cl.³ .............................................. C04B 7/02
[52] U.S. Cl. ...................................... 106/89; 106/100
[58] Field of Search ................................. 106/89, 100

[56] References Cited

U.S. PATENT DOCUMENTS

| | | | |
|---|---|---|---|
| 1,124,238 | 1/1915 | Brown | 106/100 |
| 1,194,344 | 8/1916 | Huber et al. | 106/100 |
| 1,250,291 | 12/1917 | Ellis | 106/100 |
| 3,819,389 | 2/1975 | Uchikawa et al. | 106/100 |
| 3,856,540 | 12/1974 | Mizunuma et al. | 106/89 |
| 3,860,433 | 1/1975 | Ost et al. | 106/100 |
| 3,861,928 | 1/1975 | Slater et al. | 106/89 |
| 3,864,138 | 2/1975 | Uchikawa et al. | 106/89 |
| 3,901,722 | 8/1975 | Kitsuta et al. | 106/89 |
| 3,915,724 | 10/1975 | Kokuta et al. | 106/89 |
| 3,954,489 | 5/1976 | Uchikawa et al. | 106/89 |
| 3,964,141 | 2/1975 | Uchikawa et al. | 106/89 |
| 4,001,030 | 1/1977 | Watson et al. | 106/100 |
| 4,001,031 | 1/1977 | McCord et al. | 106/100 |
| 4,012,264 | 3/1977 | Murray et al. | 106/89 |
| 4,019,917 | 4/1977 | Murray et al. | 106/89 |
| 4,028,126 | 6/1977 | Mori et al. | 106/100 |
| 4,030,939 | 6/1977 | Mallow | 106/84 |
| 4,035,657 | 7/1977 | Mehta | 106/100 |
| 4,036,657 | 7/1977 | Mehta | 106/89 |
| 4,036,659 | 7/1977 | Stude | 106/90 |
| 4,042,408 | 8/1977 | Murray et al. | 106/100 |
| 4,054,460 | 10/1977 | Buchet et al. | 106/89 |
| 4,072,534 | 2/1978 | Ryder | 106/98 |
| 4,073,658 | 2/1978 | Ohtani et al. | 106/92 |
| 4,076,546 | 2/1978 | Simeonov et al. | 106/89 |
| 4,081,285 | 3/1978 | Pennell | 106/100 |
| 4,082,561 | 4/1978 | Nakagawa et al. | 106/89 |
| 4,083,729 | 4/1978 | Yamada et al. | 106/88 |
| 4,089,697 | 5/1978 | Pennell | 106/100 |
| 4,113,836 | 9/1978 | O'Connor | 423/171 |
| 4,115,137 | 9/1978 | Nudelman et al. | 106/100 |
| 4,115,138 | 9/1978 | Nudelman et al. | 106/100 |
| 4,116,706 | 9/1978 | Previte | 106/90 |
| 4,119,467 | 10/1978 | Nudelman et al. | 106/100 |
| 4,127,548 | 11/1978 | Alexander | 260/29.6 S |
| 4,130,441 | 12/1978 | Nudelman et al. | 106/100 |
| 4,133,693 | 1/1979 | Nudelman et al. | 106/100 |
| 4,135,941 | 1/1979 | Skalny et al. | 106/100 |
| 4,162,922 | 7/1979 | Herchenbach | 106/100 |
| 4,164,425 | 8/1979 | Nudelman et al. | 106/100 |
| 4,179,302 | 12/1979 | Nudelman et al. | 106/100 |

FOREIGN PATENT DOCUMENTS

| | | |
|---|---|---|
| 1449905 | 9/1976 | United Kingdom . |
| 1506064 | 4/1978 | United Kingdom . |
| 1500579 | 2/1979 | United Kingdom . |
| 550360 | 3/1977 | U.S.S.R. . |

OTHER PUBLICATIONS

Gilioli et al., Studies on Clinker Silicates Bearing $CaF_2$ and $CaSO_4$, Cement & Concrete Research, vol. 9, pp. 295-302, 1979.

Johansen et al., Rate of Formation of $C_3S$ in System $CaO—SiO_2—Al_2O_3—Fe_2O_3$ with addition of $CaF_2$, Cement & Concrete Research, vol. 9, pp. 1-6, 1979.

Klemm et al., Effects of $CaF_2$ Mineralization on Silicates and Melt Formation in Portland Cement Clinker, Cement & Concrete Research, vol. 9, pp. 489-496, 1979.

Smart et al., The System $CaO—Al_2O_3—Fe_2O_3$ with Added Fluoride Flux, Cement & Concrete Research, vol. 9, pp. 269-274, 1979.

Use of Boron as a Cement Additive, Portland Cement Assn. Lib. Abstracts, Skokie, Ill.

Tiwari, Use of Mineralizer in Cement Manufacture, a Step in Coal Economy.

Waanders, Fluorspar Admixes Strengthen Cement, Rock Products, Dec. 1962.

Gutt et al., $CaF_2$ as a Mineralizer in Cement-$H_2SO_4$ Process Cement Tech., Jan.-Feb., 1971.

Effect of Silicofluorides on Formation of Calcium Silicates, Aluminates and Alumino Ferrite, Cer. Bull., vol. 52, No. 8, pp. 604-609, 1973.

Sprung et al., Fluorine Balance and Fluorine Emission from Cement Kilns, 1968.

Use of Fluorspar as a Fluxing Agent in the Manufacture of Portland Cement, Limited Bibliography No. 198, Research Library, Portland Cement Association, 1978.

*Primary Examiner*—James Poer

*Attorney, Agent, or Firm*—Brumbaugh, Graves, Donohue & Raymond

[57] ABSTRACT

The present invention relates to a hydraulic cement composition having a boron- and halogen-containing component and unusually high full term as well as early strengths and acceptable setting time characteristics, which cement is characterized by the presence, as hydraulically settable calcium silicates, of about 20–70 percent of alpha-prime dicalcium silicate ($\alpha'$—$C_2S$) and about 10–50 percent of tricalcium silicate $C_3S$ based upon the weight of the composition.

26 Claims, 3 Drawing Figures

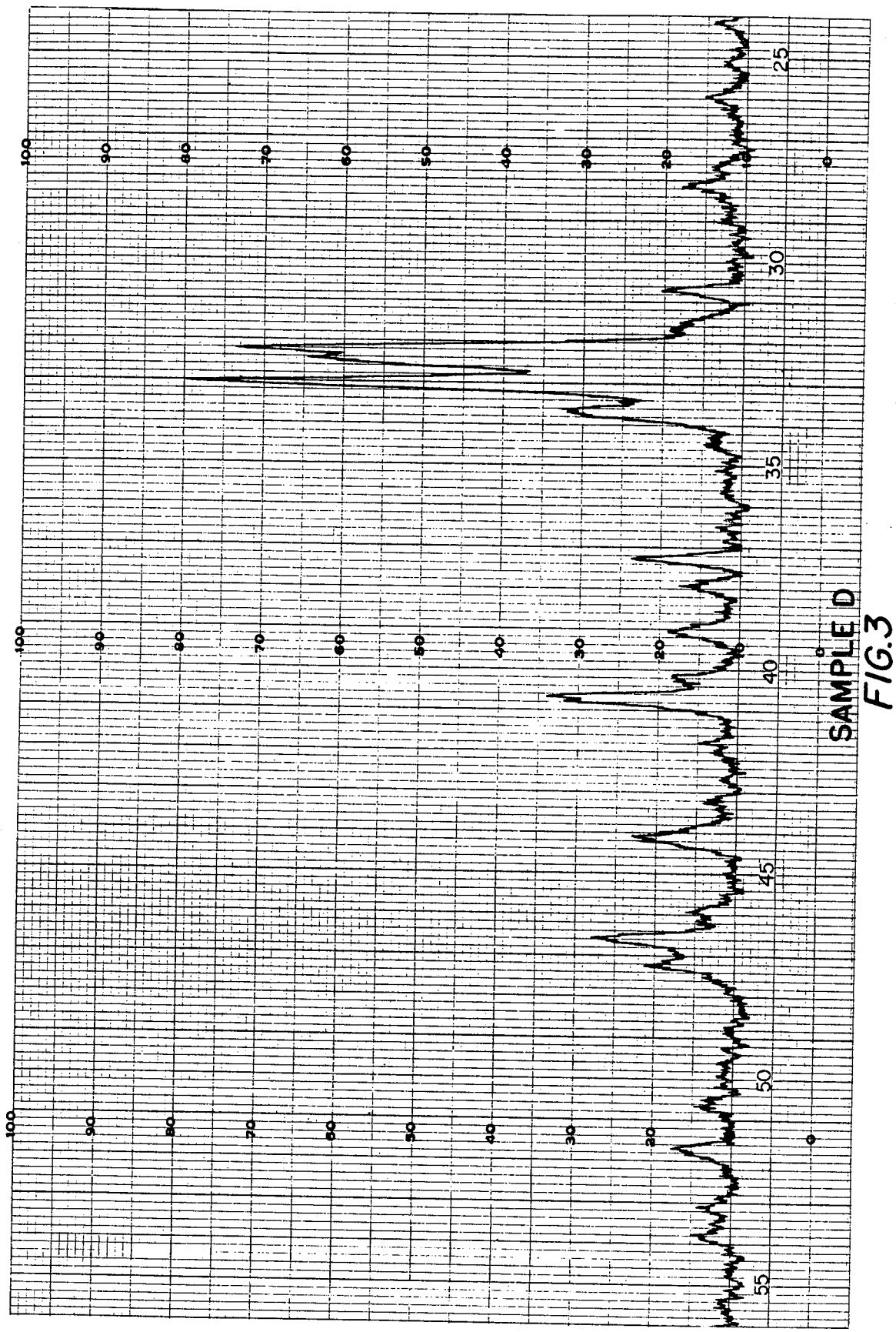
FIG.3 SAMPLE D

PORTLAND-TYPE CEMENTS

BACKGROUND OF THE INVENTION

This invention relates generally to the art of making Portland-type cement and in particular to improvements in high-strength Portland-type boron-containing cements through use of mineralizers having a halogen-containing component. The composition according to the invention achieves the formation of a Portland-type cement possessing unusually high full term as well as early strengths, and acceptable setting time characteristics.

In the typical commercial production of Portland-type cements, a calcareous type material, such as limestone, and an argillaceous type material, such as clay, are used to obtain a mixture of lime, aluminum oxide, silicon dioxide, and ferric oxide. These "raw" materials are first pulverized into a homogeneous mixture, either in dry or slurry form, and then burned in a kiln, usually of the rotary type, at temperatures normally ranging from 2,600–2,800° F. to form solid "clinker." The clinker is in turn ground with gypsum to form a fine-powdered cement. Certain "mineralizers" may be added to the raw mix prior to "clinkering" and certain "additives" may be added to the clinker during grinding to improve the strength and setting properties of the resulting cement. The composition of the cement depends upon the nature and proportion of the raw materials, mineralizers, and additives employed, as well as the temperature of the ignition and extent of grinding. The basic process reaction is such that the lime (usually as $CaCO_3$) upon heating releases carbon dioxide to form CaO or free lime which in turn reacts with the alumina ($Al_2O_3$), iron oxide ($Fe_2O_3$), and silicon dioxide ($SiO_2$) to form the basic components of cements.

In general, the basic components of Portland type cement consist of calcium silicates, calcium aluminates, and calcium alumino-ferrites, all of which form the hydraulically settable ingredients of such cement. The calcium silicates are the major components of Portland-type cement compositions and are present in various forms depending upon the nature of the raw mix and account in substantial part for the strength and setting properties of such cements. In the absence of a boron-containing component, tricalcium silicate (Alite) and β-dicalcium silicate (Belite) are formed and stabilized. However, in boron-containing Portland-type cements, typified by U.S. Pat. No. 3,861,928 to Slater and Hamilton, issued Jan. 21, 1975, the disclosure of which is incorporated herein by reference, alpha-prime dicalcium silicate ($\alpha'$-$C_2S$) is formed and stabilized to the exclusion of the $C_3S$ and $\beta'$-$C_2S$ compositions which would otherwise be formed and stabilized ($C_3S$ and $\beta'$-$C_2S$ are stabilized in such small amounts, if at all, that they cannot readily be identified by X-ray diffraction analysis). The boron-containing cements of Slater and Hamilton are also characterized by a free lime content less than about 2% and the presence of borate (as $B_2O_3$) dissolved with lime in the $\alpha'$-$C_2S$ phase in a ratio of five moles of CaO per mole of $B_2O_3$. The cements disclosed by Slater and Hamilton contain a relatively small portion of a boron-containing compound, such as boric oxide ($B_2O_3$), which is added as a mineralizer to the raw mixture prior to clinkering. The addition of the boron component permits the formation of a Portland-type clinker at temperatures substantially lower (2350–2550° F.) than those formerly necessary in commercial practice at about the same kiln retention time. Moreover, boron-containing cement compositions can be made to achieve full term (i.e., after 28 days) compressive strengths in the order of about 9,000 psi which is far superior to other Portland-type cements. These advantages of prior boron-containing cements have been attributed to the $\alpha'$-$C_2S$, which is usually present in an amount of about 65 percent to about 85 percent by weight of the composition.

While boron-containing Portland-type cements typified by those of Slater and Hamilton represent a significant advance in the field of cement chemistry, their commercial use presents several drawbacks. For example, although superior full terms strengths are achieved, the results have been inconsistent and the setting times erratic. Moreover, the early and intermediate strengths for these cements are not satisfactory for many commercial purposes.

Many attempts have been made to improve boron-containing Portland cements such as to overcome the early and intermediate strength drawbacks while maintaining the excellent full term strengths. It is known that the early strength characteristics of conventional Portland-type cements is attributed to the formation of about 50–60% $C_3S$ in the clinker, see Lea, *The Chemistry of Cement and Concrete*, (3d Ed. Chemists Publishing Co. 1977, pg. 82). But, to pursue the idea of increasing early strength in boron-containing cements by forming such amounts of $C_3S$ was antithetical in view of the work of Slater and Hamilton. They had attributed the high full term strength to the formation of $\alpha'$-$C_2S$ to the exclusion of $C_3S$. Moreover, prior teaching in the art and belief in the industry was that $C_3S$ could not be formed in the presence of borates. See Mircea, "Decomposition of Tricalcium Silicate With Boron Oxide," *Silikatz (Ceskoslovenska Akademie Ved)*, 9(1) 34–42 (1965), which discloses that boric oxides react with tricalcium silicate to form free lime and a saturated solid solution of dicalcium silicate and pentacalcium borosilicate ($5CaO:1B_2O_3:1SiO_2$).

Initial efforts to improve the properties of boron-containing Portland-type cements were directed toward development of high early strengths by means which would retain the $\alpha'$-$C_2S$ formation characteristics. Unsuccessful efforts to gain early strength included reducing the clinker particle size and varying the raw mix constituents—particularly as to the composition of the iron phase. Attempts were also made without success to gain high early strengths and more consistent setting times by use of strength accelerators and water reducing additives. Other efforts included the physical blending of high early strength cements (see U.S. Pat. No. 4,036,657 to Mehta) with the $\alpha'$-$C_2S$-containing boron cement of Slater and Hamilton. Samples made utilizing the Metha cement (i.e., containing $C_4A_3\overline{S}$), which has an early strength superior to the $C_3S$-containing cement, mixed with the boron-containing cement both before and after clinkering, exhibited low intermediate and full term strengths, e.g., 1,475 psi 7-day, and 4,150 psi 28-day strength.

Notwithstanding prior teachings and beliefs, the present invention is based upon the combined formation of $C_3S$ and $\alpha'$-$C_2S$ in boron-containing Portland-type cements to achieve not only improved, but surprisingly superior early strengths as compared to those previously attained. In addition, it has been found that these superior early strengths are achieved within acceptable setting times and without affecting the excellent full term strengths of boron-containing cements. Moreover, the full term strengths are now attained on a more consistent basis.

SUMMARY OF THE INVENTION

The foregoing objects and advantages of the invention are achieved by producing a cement composition having as its hydraulically-setting calcium silicates, both alpha-prime dicalcium silicate ($\alpha'$-$C_2S$) in an amount of about 20 percent to about 70 percent, and tricalcium silicate ($C_3S$) in an amount of about 10 percent to about 50 percent, based upon the weight of the composition. The other components of the cement composition, namely, tricalcium aluminate and tetracalcium aluminoferrite, are those normally found in Portland-type cement and are not believed to affect in any critical way the properties of the resulting clinker or cement.

The formation of the $C_3S$ and $\alpha'$-$C_2S$ is accomplished by clinkering at the desirable lower burn temperatures of boron-containing cements, i.e., 2,350-2,550° F., employing similar kiln retention times, e.g. on the order of 30 minutes to 1 hour depending on the size of the kiln and other factors. The $C_3S$ and $\alpha'$-$C_2S$ are stabilized by incorporating into the raw mix ingredients conventionally employed for the production of a boron-containing Portland cement (i.e., limestone, silica, alumina, iron oxide and a boron-containing component), a mineralizer consisting essentially of a halogen-containing component. The $C_3S$ and $\alpha'$-$C_2S$ are preferably formed and stabilized in situ in a chemical reaction during clinker formation.

As disclosed in the Slater and Hamilton '928 patent, the lime content of the raw mix preferably should be about 0.5 percent in excess of theoretical for complete formation of the potential clinker compounds. This "lime saturation" of the raw mix cement must be controlled so as to ensure that the free lime content of the clinker does not exceed about 2 percent to avoid excessive expansion in the resultant cement. The cement clinker formed from a raw mix according to the present invention and ground to a minimum fineness of about 4,000 cm$^2$/g (Blaine) produces a cement composition which possesses satisfactory setting characteristics and attains high early and intermediate strengths as well as the high full term strengths normally associated with boron-containing Portland-type cements.

The consistent and unusually high 3-day and 7-day mortar cube (ASTM C-109) strengths achieved by the invention appear from the laboratory data available to date to be caused by, inter alia, the rapid rates of $C_3S$ hydration. While this factor alone is unremarkable, since any cement containing $C_3S$ is characterized by rapid $C_3S$ hydration, the $C_3S$ in the boron-halogen cement compositions of the invention is also believed to act as both a "seeding" and "stabilizing" agent during $\alpha'$-$C_2S$ hydration. It is believed that the early and intermediate strengths achieved, particularly with regard to that embodiment of the invention wherein the $C_3S$ and $\alpha'$-$C_2S$ are formed in situ, represent the cumulative effect of strength development by the individual $C_3S$ and $\alpha'$-$C_2S$ compounds and a synergistic effect resulting from the interaction of these compounds. The belief that synergistic effects are experienced for this embodiment of the invention composition is based upon the results achieved by the chemically reactive formation of the $C_3S$ and $\alpha'$-$C_2S$ as opposed to physical blending of these components from separate sources. In this regard, it has been found that when pure $C_3S$ was blended into the prior boron-containing clinker of Slater and Hamilton after grinding, the resultant samples exhibit intermediate strengths in the order of about 4,200 psi 3-day, 5,400 psi 7-day and full term strengths of about 7,000 psi as compared to the prior boron compositions of Slater and Hamilton and to the invention compositions containing $C_3S$ and $\alpha'$-$C_2S$ formed in situ (cf. Tables I and II).

DETAILED DESCRIPTION

The basic raw mix of Portland-type cements according to the invention is formed by conventional procedures. A mixture of raw materials composed of calcareous and argillaceous type minerals containing calcium oxide, silicon dioxide, aluminum oxide and iron oxide is prepared for pulverization by known techniques. Limestone can be utilized as the source of calcium oxide. Silicon dioxide can be supplied in the form of sand. Clay or shale can be the source of aluminum oxide. The source of iron oxide can be mill scale, a by-product of steel mills, pyrite cinders, a by-product of sulfuric acid production, or iron ore. Iron oxide also is usually present in the raw materials used as the source of silicon dioxide and aluminum oxide. These basic raw materials are proportioned and blended to maintain the relative proportions of the oxides within known limits, in accordance with well-known practice, to produce a Portland-type cement having desired properties and characteristics.

In accordance with the invention, boron- and halogen-containing mineralizers are added to the raw mix at any time prior to clinkering. The boron-containing mineralizer, in accordance with the Slater and Hamilton '928 patent disclosure, is preferably added as a borate in an amount sufficient to yield a composition having 5 mols of CaO for each mole of $B_2O_3$. The amount of the halogen-containing component added is sufficient to yield a clinker composition having a minimum halogen content of about 0.5 percent, and preferably not greater than 2.0 percent, of the composition. The boron- and halogen-containing mineralizers may be intimately blended and intermixed with the raw pulverized mixture or can be added during the initial raw feed grinding process. In any event, the blended raw mix containing the ground borate and halogen mineralizers is fed to the kiln for clinkering. The clinker, with the addition of gypsum and any other desired additives, such as strength accelerators and water reducers, is ground to fineness of at least about 4,000 cm$^2$/g (Blaine), and preferably not more than about 6,000 cm$^2$/g (Blaine), to form the cement.

While boric oxide ($B_2O_3$) is the preferred boron-containing component, other similarly suitable materials include: colemenite, ulexite, borax, or any boron-containing material of an organic or inorganic nature. The amount of boric oxide calculated as $B_2O_3$ is preferably a minimum of about 1 percent by weight of the clinker composition, and preferably not more than about 2.5 percent.

With regard to the halogen-containing component, calcium fluoride and chloride are preferred. However, any halogen-containing material compatible with cement compositions would be suitable, including inter alia halides of calcium, sodium, potassium, and magnesium and silico-halides.

In Table I below, cement Samples A, B, and C containing both borate and calcium fluoride according to the invention, are compared as to strength at stated finenesses with four conventional boron cements (Samples D, E, F, and G) containing $\alpha'$-$C_2S$ exclusively or predominantly as described in the Slater and Hamilton patent. The clinker formula for Samples A, B, and C was calculated as follows:

| | |
|---|---|
| CaO | 68.3% |
| $SiO_2$ | 24.0% |
| $Al_2O_3$ | 3.3% |
| $Fe_2O_3$ | 1.0% |
| $B_2O_3$ | 1.5% |
| $CaF_2$ | 2.0% |

The halide-boron clinker compositions for Samples A, B, and C were prepared based upon the following approximate calculated clinker composition values based upon the use of compounded amounts of reagent grade chemicals:

| | |
|---|---|
| $C_3S$ | 39.25% |
| $C_2S$ | 39.25% |
| $C_4AF$ | 3% |
| $C_3A$ | 7% |
| $CaF_2$ | 2% |
| $C_5B$ | 7.5% |
| Free CaO | 2.0% |

The boron-containing Portland-type clinker mixes of Samples D, E, F, and G were made from conventional raw materials by adding borate in the form of ulexite before sintering and grinding to the Blaine specified in Table I. The clinkers of Samples D, E, F and G were analyzed:

| | D | E | F | G |
|---|---|---|---|---|
| CaO | 62.2% | 60.3% | 62.2% | 62.2% |
| $SiO_2$ | 23.2% | 24.7% | 23.2% | 23.5% |
| $Al_2O_3$ | 5.2% | 5.1% | 5.2% | 5.1% |
| $Fe_2O_3$ | 4.2% | 3.9% | 4.2% | 4.3% |
| $B_2O_3$ | 1.8% | 1.7% | 1.8% | 1.7% | strengths, and the degree of fineness (i.e., Blaine) were varied. As can be seen from the comparative values of Table I, the invention compositions possess unusually high early (i.e., 1-day) and intermediate (i.e., 3-day and 7-day) strengths, and provide more consistent full term (i.e., 28-day) strengths than typical boron-containing cements.

Clinker Samples, H, I, J, K, L, M-1 and M-2 were prepared based on the same calculated values used for clinker Samples A, B, and C, and were made using the following formulas:

| | H | I | J | K | L | M-1/M-2 |
|---|---|---|---|---|---|---|
| CaO | 863.2g | 843.9g | 4445g | 829.5g | 3392g | 845.9g |
| $SiO_2$ | 171.8g | 171.2g | 865g | 154.8g | 672.4g | 171.8g |
| $Al_2O_3$ | 23.0g | 23.0g | 115g | 33.3g | 92.0g | 23.0g |
| $Fe_2O_3$ | 7.0g | 7.0g | 35g | 23.0g | 28.0g | 7.0g |
| $B_2O_3$ | 10.7g | 10.5g | 54g | 10.5g | 50.4g | 10.8g |
| $CaF_2$ | — | 15.8g | 55g | 14.0g | 58.8g | 14.7g |
| $CaCl_2$ | 14.6g | — | — | — | — | — |

The results of strength tests on the cement made from the clinker Samples H through M-2, as seen in Table II below, show $C_3S$ and $\alpha'$-$C_2S$ formation for maximum strengths is controlled, among other things, by the fineness of the grind (Blaine) at optimum sulfur trioxide ($SO_3$) and ferric oxide ($Fe_2O_3$) conditions.

TABLE II

| Cement Sample | % $SO_3$ | % '—$C_2S$ | % $C_3S$ | % $B_2O_3$ | % Halide | % $Fe_3O$ | Blaine | Strengths in PSI | | | |
|---|---|---|---|---|---|---|---|---|---|---|---|
| | | | | | | | | 1 Day | 3 Day | 7 Day | 28 Day |
| H | 2.5 | 41 | 29 | 1.5 | 2.0 ($CaCl_2$) | 1.0 | 4930 | 2212 | 4704 | 5945 | 7935 |
| I | 2.5 | 41 | 36 | 1.5 | 2.25 ($CaF_2$) | 1.0 | 5124 | 2176 | 5262 | 7525 | 9255 |
| J | 2.5 | 42 | 36 | 1.5 | 1.5 ($CaF_2$) | 3.3 | 5545 | 2595 | 5050 | 7838 | 9106 |
| K | 2.5 | 34 | 36 | 1.5 | 2.0 ($CaF_2$) | 1.0 | 5587 | 2605 | 5633 | 7803 | 9718 |
| L | 2.5 | 40 | 36 | 1.8 | 2.0 ($CaF_2$) | 1.0 | 5472 | 2321 | 5687 | 7724 | 9118 |
| M-1 | 2.0 | 41 | 36 | 1.5 | 2.0 ($CaF_2$) | 1.0 | 5091 | 1879 | 4845 | 7620 | 9687 |
| M-2 | 2.0 | 41 | 36 | 1.5 | 2.0 ($CaF_2$) | 1.0 | 4425 | 1515 | 4470 | 6637 | 9000* |

*Estimated from 32 day breaks (9087 psi)

The data in Table II show that the cement compositions exemplified by Samples I, J, K and L according to the invention are preferred.

As seen in Tables I and II, the boron/halogen cements according to the invention far outperform the prior boron-containing cements with regard to all phases of strength development, i.e. higher early and intermediate strengths and more uniform full term strengths. The results shown in Tables I and II further show that optimum results are obtained by using the boron-fluoride compositions formulated as follows:

| | |
|---|---|
| $CaF_2$ | 1.5% ± 0.5% |
| $B_2O_3$ | 1.5% ± 0.2% |
| $Fe_2O_3$ | 1%–3.5% |

TABLE I

| Cement Sample | % $SO_3$ | % $\alpha'$—$C_2S$ | % $C_S$ | % $B_2O_3$ | % Halide | % $Fe_2O_3$ | Blaine | Strengths in PSI | | | |
|---|---|---|---|---|---|---|---|---|---|---|---|
| | | | | | | | | 1 Day | 3 Day | 7 Day | 28 Day |
| A | 2.5 | 38.3 | 38.3 | 1.5 | 2.0 ($CaF_2$) | 1.0 | 5323 | 2010 | 5600 | 7541 | 9808 |
| B | 1.5 | 38.7 | 38.7 | 1.5 | 2.0 ($CaF_2$) | 1.0 | 5213 | 1020 | 3895 | 7391 | 9574 |
| C | 3.0 | 38.1 | 38.1 | 1.5 | 2.0 ($CaF_2$) | 1.0 | 5600 | 2089 | 5099 | 7433 | 9628 |
| D | 0.7 | 67 | — | 1.8 | — | 4.2 | 4885 | 680 | 3158 | 4887 | 6840 |
| E | 1.2 | 66 | — | 1.7 | — | 3.9 | 4785 | 121 | 637 | 2908 | 8808 |
| F | 0.7 | 67 | — | 1.8 | — | 4.2 | 5566 | 964 | 3191 | 5041 | 5920 |
| G | 3.6 | 65 | — | 1.7 | — | 4.3 | 5450 | 155 | 1837 | 4366 | 8253 |

As indicated in Table I, only the amount of $SO_3$, which is added to the grinding mill normally in the form of gypsum to control setting time and to optimize

| -continued | |
|---|---|
| Fineness (Blaine) | 5,000–5,500 cm²/g |

Furthermore, the setting times for the boron-halide cements have been consistently acceptable. Representative setting characteristics comprise Vicats of 3 hrs., 10 minutes (initial) and 5 hrs., 45 minutes (final) and Gilmore readings of 75 minutes (initial) and 104 minutes (final). This additional favorable feature is quite surprising, since the setting times of the prior boron-containing cements were often long and erratic, and, for that reason, limited in their commercial application.

BRIEF DESCRIPTION OF THE DRAWINGS

As previously stated, the crystalline composition of cement produced according to this invention is notably different from the structure of conventional Portland cements which contain predominately $C_3S$ and $\beta$-$C_2S$ and from that of prior boron-containing cements containing $\alpha'$-$C_2S$ to the exclusion of $C_3S$. The X-ray diffraction analyses shown in FIGS. 2 and 3 of the drawings represent the crystalline structure, respectively, for the cements designated as Sample K from Table II and Sample D from Table I above. FIG. 2 shows the pertinent section of the X-ray diffraction chart from which can be seen the characteristic triple peaks at angle 2-theta of 32.4°, 32.5°, and 32.6° for $\alpha'$-$C_2S$ and of 29.4° for $C_3S$. In FIG. 3, however, there is no characteristic $C_3S$ peak at approximately 29.4°, but there are characteristic $\alpha'$-$C_2S$ peaks at approximately 32.4° to 32.6°. It is believed that this distinction in calcium silicate formation accounts for the improvements achieved through the present invention. The high early and intermediate strengths are thought to be attributable to the cumulative and synergistic effects of the reaction kinetics of $C_3S$ and $\alpha'$-$C_2S$, while the more consistent long term strengths are believed to be the result of the "seeding" or stabilizing effect of the $C_3S$ hydration product on the hydration of $\alpha'$-$C_2S$.

Figure 1:
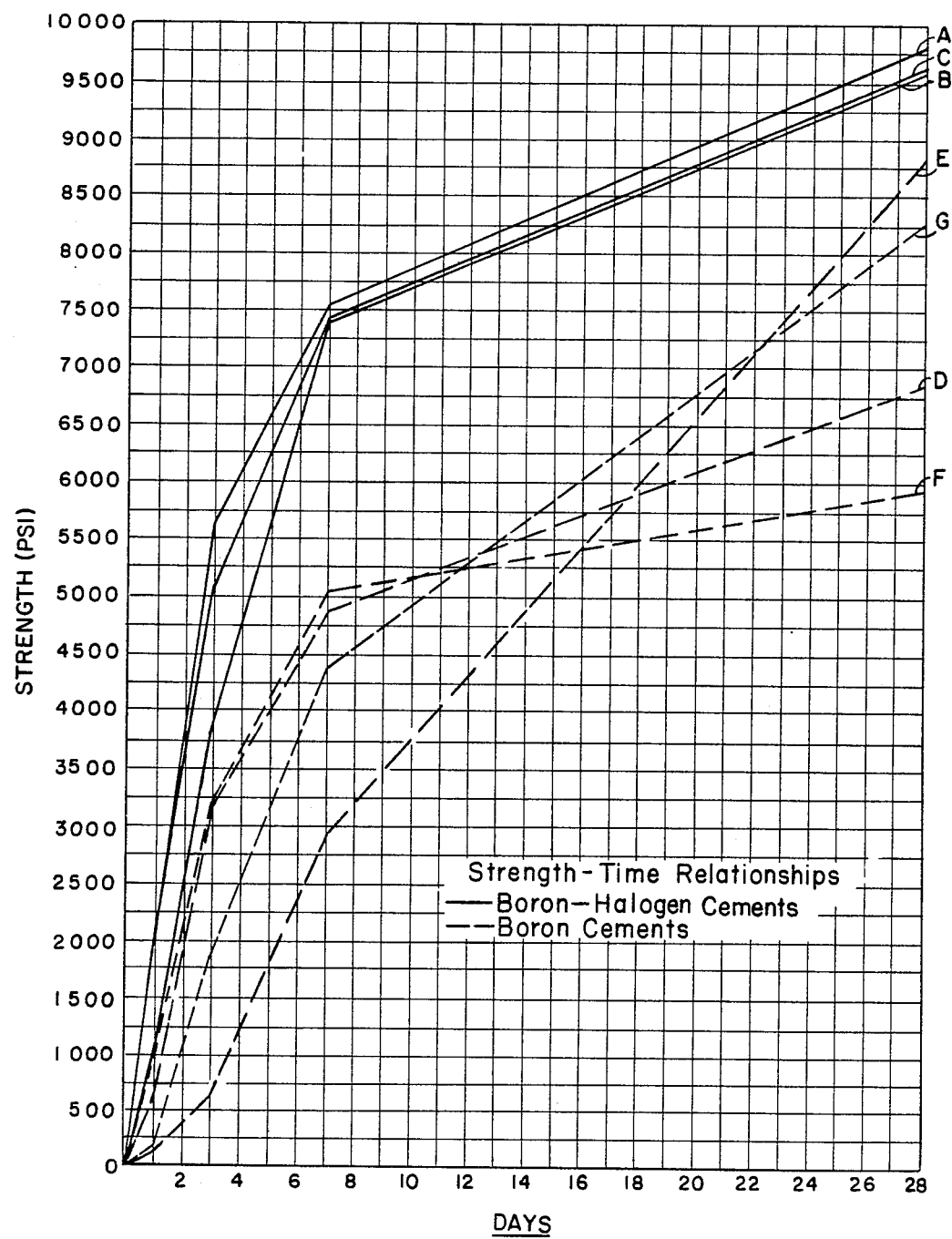
In FIG. 1, the various strengths of the cement compositions shown in Table I are plotted against age. The difference between the boron-containing cements and the boron/halogen cements is substantial and the results as shown in FIG. 1 demonstrate the consistency of the boron-halide invention cements in achieving better strengths.
Figure 2:
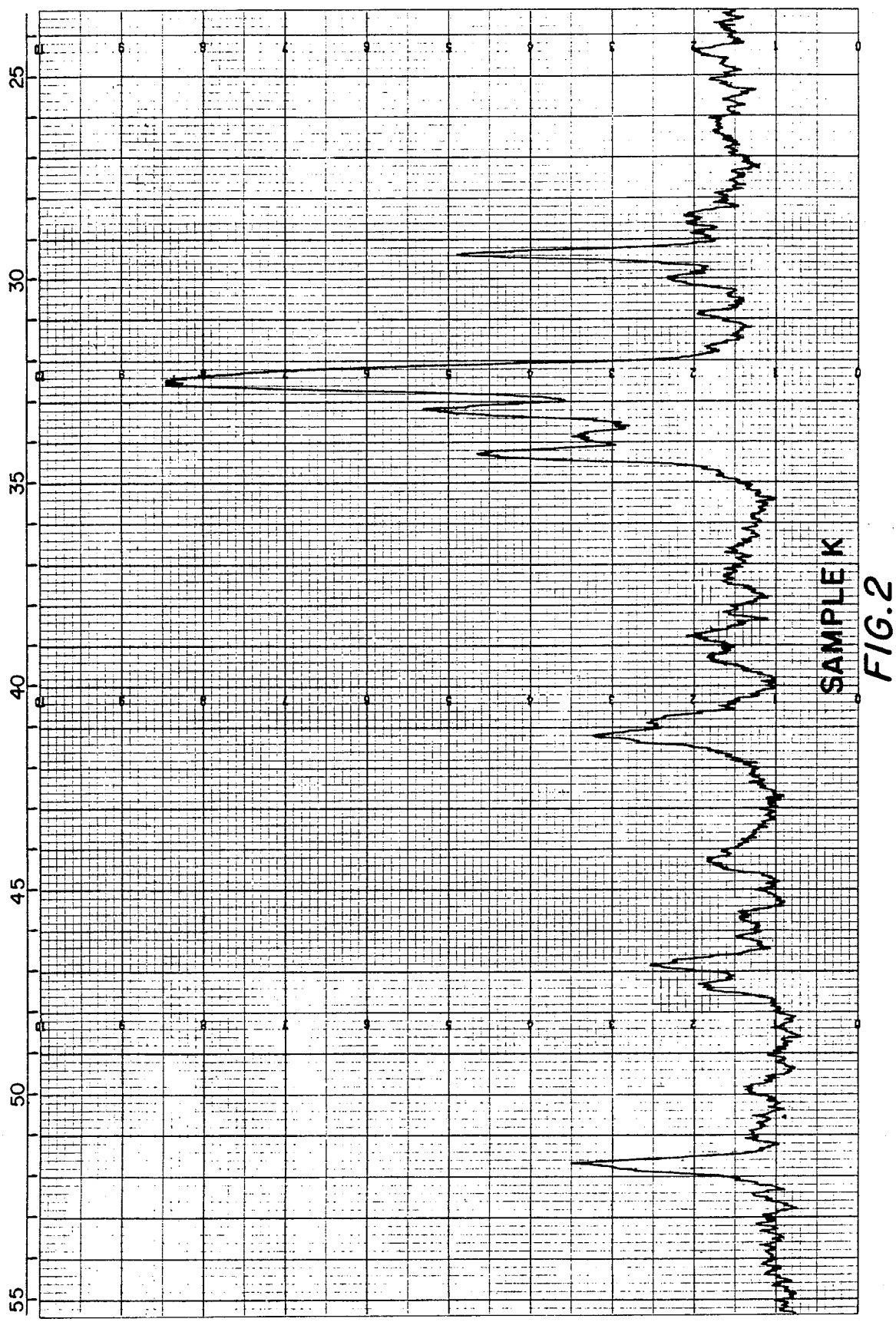
FIG. 2 demonstrates the presence of both $\alpha'$-$C_2S$ and $C_3S$ in Sample K, as compared to FIG. 3 which shows predominantly $\alpha'$-$C_2S$ for Sample D.

While there have been described what are presently believed to be preferred embodiments of the invention, it will be apparent to a person skilled in the art that numerous changes can be made in the ingredients, conditions and proportions set forth in the foregoing embodiments without departing from the invention as described herein and as defined in the appended claims.

I claim:

1. A hydraulic cement composition comprising as hydraulically settable calcium silicates, alpha-prime dicalcium silicate in an amount of about 20 percent to about 70 percent by weight of said composition and tricalcium silicate in an amount of about 10 percent to about 50 percent by weight of said composition.

2. A hydraulic cement composition according to claim 1 wherein the alpha-prime dicalcium silicate and tricalcium silicate are formed and stabilized in situ in a chemical reaction during clinker formation.

3. A hydraulic cement composition according to claim 2 which is a Portland-type cement.

4. A hydraulic cement composition according to claim 3 further comprising a boron-containing component.

5. A hydraulic cement composition according to claim 4 further comprising a halogen-containing component.

6. A hydraulic cement composition according to claim 5 wherein the boron-containing component is boric oxide ($B_2O_3$).

7. A hydraulic cement composition according to claim 6 wherein the amount of boric oxide is a minimum of about 1 percent by weight of said composition.

8. A hydraulic cement composition according to claim 7 wherein the amount of boric oxide is about 1 percent to about 2.5 percent by weight of said composition.

9. A hydraulic cement composition according to claim 6 wherein the said $B_2O_3$ and lime are in solid solution in the said alpha-prime dicalcium silicate in a ratio of about five moles of lime per mole of $B_2O_3$.

10. A hydraulic cement composition according to claim 5 wherein the halogen-containing component is a calcium halide.

11. A hydraulic cement composition according to claim 9 wherein the halogen-containing component is calcium fluoride.

12. A hydraulic cement composition according to claim 8 wherein the amount of halogen is about 0.5 to about 2.0 percent by weight of said composition.

13. A hydraulic cement composition according to claim 3 having a minimum fineness of about 4,000 cm²/g (Blaine).

14. A hydraulic cement composition according to claim 3 having a fineness of about 4,000–6,000 cm²/g (Blaine).

15. A hydraulic cement composition according to claim 3 wherein the amount of free lime is less than about 2.0 percent by weight of said composition.

16. A method of making a hydraulic cement composition containing as hydraulically settable calcium silicates, $\alpha'$ dicalcium silicate in an amount of about 20 percent to about 70 percent by weight of said composition and tricalcium silicate in an amount of about 10 percent to about 50 percent by weight of said composition which comprises: (1) forming a mixture of pulverized lime-containing component, silicon oxide-containing component, aluminum oxide-containing component, iron oxide-containing component, a halogen-containing component and a boron-containing component in an amount sufficient to provide at least about 1% by weight of $B_2O_3$ in a ratio of five mols of calcium oxide per mol of $B_2O_3$; (2) heating said mixture to a temperature of about 2,350–2,550° F. to fuse the components thereof into a clinker and to form said $\alpha'$ dicalcium silicate in an amount of about 20 percent to about 70 percent by weight of said composition and tricalcium silicate in an amount of about 10 percent to about 50 percent by weight of said composition; and (3) grinding said clinker.

17. The method according to claim 16 wherein the $\alpha'$ dicalcium silicate and tricalcium silicate are formed and stabilized in situ in a chemical reaction during clinker formation.

18. The method according to claim 17 wherein the cement is a Portland-type cement.

19. The method according to claim 18 wherein the boron-containing component is boric oxide ($B_2O_3$).

20. The process according to claim 19 wherein the amount of boric oxide is about 1 percent to about 2.5 percent by weight of the said composition.

21. The method according to claim 20 wherein the halogen-containing component is a calcium halide.

22. The method according to claim 21 wherein the halogen-containing component is a calcium fluoride.

23. The method according to claim 20 wherein the amount of halogen-containing component is about 0.5 to about 2.0 percent by weight of said composition.

24. The method according to claim 18 wherein the hydraulic cement composition is ground to a minimum fineness of about 4,000 $cm^2/g$ (Blaine).

25. The method according to claim 18 wherein the hydraulic cement composition is ground to a fineness of about 4,000–6,000 $cm^2/g$ (Blaine).

26. The method according to claim 18 wherein the amount of free lime in the hydraulic cement composition is less than about 2.0 percent by weight of said composition.

* * * * *

UNITED STATES PATENT AND TRADEMARK OFFICE
CERTIFICATE OF CORRECTION

PATENT NO. : 4,319,927    Page 1 of 2

DATED : March 16, 1982

INVENTOR(S) : Robert M. Segal

It is certified that error appears in the above—identified patent and that said Letters Patent is hereby corrected as shown below:

First page, 2nd col., 3rd item under heading "FOREIGN PATENT DOCUMENTS", "2/1979" should read --2/1978--;

First page, 2nd col., 4th item under heading "FOREIGN PATENT DOCUMENTS", "3/1977" should read --4/1977--;

First page, 2nd col., first line under heading "OTHER PUBLICATIONS", after "Clinker" insert --Calcium--;

First page, 2nd col., 5th line under heading "OTHER PUBLICATIONS", after "$Fe_2O_3$" insert -- -MgO --;

First page, 1st col., 4th item under heading "U. S. PATENT DOCUMENTS", "2/1975" should read --6/1974--;

First page, 2nd col., 9th line under "OTHER PUBLICATIONS" insert --Mehta et al., Utilization of Phosphogypsum in Portland Cement Industry, Cement and Concrete Research, Vol. 7, pp. 537-544 (1977).--;

First page, 2nd col., 14th line under "OTHER PUBLICATIONS" insert --Effect of Minor Elements in Portland Cement, Portland Cement Research Library, Skokie, Illinois.--;

First page, 1st col., 12th item under heading "U. S. PATENT DOCUMENTS", "3,964,141" should be --3,864,141--;

UNITED STATES PATENT AND TRADEMARK OFFICE
CERTIFICATE OF CORRECTION

PATENT NO. : 4,319,927

DATED : March 16, 1982

INVENTOR(S) : Robert M. Segal

It is certified that error appears in the above—identified patent and that said Letters Patent is hereby corrected as shown below:

First page, 2nd col., 28th line under "OTHER PUBLICATIONS" insert
--Fluxes or Mineralizers for Portland Cement Clinkers, Special Bibliography No. 56, (1960), Portland Cement Association Research Library. Simanovskaya et al., Effect of Fluorine in the Presence of Phosphates on the Reaction of Formation and the Crystallization of the Minerals of Cement Clinker, Tsement 1955, Vol. 21, No. 5 pp. 12-14.
Simanovskaya et al., The Effect of Calcium Fluoride in the Presence of Tricalcium Phosphate on the Reaction of Formation and Crystallization of Clinker Minerals, Zhur Priklab Khim, Vol. 29, pp. 988-996 (1956).
Russian Scientists Discover "New Mineral", World Cement Technology, Vol. 10, No. 9, pp. 375, Nov. 1979.--;

Col. 2, line 56, "Metha" should read --Mehta--;

Col. 5, TABLE I, heading of 4th col., "$\%C_S$" should read --$\% C_3S$--;

Col. 6, TABLE II, heading on third col., "$\% '-C_2S$" should read --$\% \alpha '-C_2S$--.

Signed and Sealed this

Seventeenth Day of May 1983

[SEAL]

Attest:

DONALD J. QUIGG

Attesting Officer    Acting Commissioner of Patents and Trademarks